United States Patent [19]

Stenkvist

[11] Patent Number: 5,317,591
[45] Date of Patent: May 31, 1994

[54] DIRECT-CURRENT ARC FURNACE

[75] Inventor: Sven-Einar Stenkvist, Brugg, Switzerland

[73] Assignee: Asea Brown Boveri Ltd., Baden, Switzerland

[21] Appl. No.: 901,022

[22] Filed: Jun. 19, 1992

[30] Foreign Application Priority Data

Jun. 20, 1991 [CH] Switzerland .................. 1827/91

[51] Int. Cl.$^5$ .................................. H05B 7/144
[52] U.S. Cl. .................... 373/107; 373/102; 373/104; 373/108; 75/10.26; 164/254
[58] Field of Search .......... 373/108, 102, 107, 60, 373/64, 104; 75/10.26; 164/254; 219/130.1

[56] References Cited

U.S. PATENT DOCUMENTS

| | | | |
|---|---|---|---|
| 2,727,936 | 12/1955 | Boyer | 373/68 |
| 3,683,094 | 8/1972 | Schlienger | 373/108 |
| 3,997,712 | 12/1976 | Stenkvist | 373/107 |
| 4,016,355 | 4/1977 | Stenkvist | 373/108 |
| 4,032,704 | 6/1977 | Stenkvist | 373/108 |
| 4,038,483 | 7/1977 | Stenkvist | 373/107 |
| 4,100,364 | 7/1978 | Kollberg | 373/108 |
| 4,110,546 | 8/1978 | Stenkvist | 373/107 |
| 4,135,052 | 1/1979 | Stenkvist et al. | 373/108 |
| 4,149,024 | 4/1979 | Stenkvist et al. | 373/107 |
| 4,435,811 | 3/1984 | Varrasso | 373/39 |
| 4,495,625 | 1/1985 | Heberlein et al. | 373/107 |
| 4,821,284 | 4/1989 | Janiak et al. | 373/107 |
| 4,856,021 | 8/1989 | Janiak et al. | 373/108 |
| 5,134,628 | 7/1992 | Slenkvist | 373/107 |
| 5,138,630 | 8/1992 | Suga | 373/107 |

FOREIGN PATENT DOCUMENTS

| | | |
|---|---|---|
| 0456085 | 11/1991 | European Pat. Off. . |
| 1053690 | 3/1959 | Fed. Rep. of Germany . |
| 4035233 | 5/1991 | Fed. Rep. of Germany . |
| 0593283 | 8/1925 | France . |
| 1422830 | 11/1965 | France . |
| 1097394 | 4/1989 | Japan . |
| 0939521 | 10/1963 | United Kingdom . |

*Primary Examiner*—Bruce A. Reynolds
*Assistant Examiner*—Tu Hoang
*Attorney, Agent, or Firm*—Oblon, Spivak, McClelland, Maier & Neustadt

[57] ABSTRACT

In a direct-current arc furnace having a bottom contact (3) which has a large area, electromagnetically produced bath agitations are influenced by an electromagnet (9) disposed underneath the vessel bottom (4) such that the natural flow in the melt bath, caused by the current flow in the melt, is reversed in direction. In this way the stability of the bottom electrode (3) is substantially increased. The electromagnet (9) is preferably integrated into the electric supply system of the furnace and serves as a smoothing choke.

5 Claims, 2 Drawing Sheets

DIRECT-CURRENT ARC FURNACE

BACKGROUND OF THE INVENTION

1. Field of the Invention

The invention relates to a direct-current arc furnace having at least one electrode connected as a cathode and at least one bottom electrode connected as an anode.

In this connection, the invention makes reference to a prior art as revealed, for example, in U.S. Pat. No. 4,032,704.

2. Discussion of Background

In direct-current arc furnaces the bottom electrode is the most highly stressed component. It consists, for example, of one or more steel bodies extending through the vessel bottom and its lining and making the electrical contact with the melt in the interior of the furnace. The bottom electrode is connected to the current supply of the furnace outside the vessel bottom. In modern direct-current arc furnaces the entire furnace bottom forms the bottom electrode, which is either in the form of an electrically conductive lining layer comprising electrically conductive bricks or in the form of a non-conductive lining containing interspersed metal rods or metal sheets.

The furnace current flowing through the melt leads to a bath agitation in the melt. This bath agitation has a favorable effect on the melting process and on temperature equalization in the melt bath. In high-power arc furnaces, which are operated with direct currents of up to 120 kA or more, there is however a danger that the flow in the melt—which entails speeds of up to 0.5 meter per second—will increase wear on the furnace bottom, in the region under the electrode, through erosion. Particularly in direct-current arc furnaces in which the bottom electrode (bottom contact) has a large area, these processes shorten the service life of the furnace vessel.

SUMMARY OF THE INVENTION

Starting from the prior art, the object on which the invention is based is that of providing a direct-current arc furnace, the bottom electrode of which is protected against the action of erosion and thus has a longer life.

This object is achieved according to the invention by the fact that underneath the furnace bottom a coil is provided through which flows a direct current, preferably the furnace current, and which has a coil area approximately corresponding to the area of the bottom electrode, the ampere-turns number being such that the downwardly directed bath agitation in the melt, produced solely by the current flow in the melt underneath the electrode, is at least partly reversed to the opposite direction by the magnetic field of said coil.

It is true that in U.S. Pat. No. 4,032,704 it has already been proposed to provide an electromagnet supplied with direct current on the underside of the furnace vessel of a direct current arc furnace. This electromagnet however serves expressly to produce an additional stirring motion in the melt in order to accelerate metallurgical reactions and temperature equalization in the melt. In respect of the dimensions of the magnet and its undermentioned, not immediately foreseeable effects on the bath agitation of the melt and the service life of the furnace vessel, no information can be gained from this patent specification.

In the case of the invention the coil produces a stationary magnetic field. Through the action of the magnetic field on the current in the melt, forces are generated by which the melt is caused to rotate about the vertical axis of the furnace. This rotation gives rise to a secondary action of the magnetic field, whereby magnetic forces are produced in the melt bath which counteract the flow of the melt from the arc zone to the furnace bottom. However, a bath agitation advantageously affecting heat exchange still occurs in the melt, as previously.

The coil can be integrated into the furnace plant without great expense, both in the case of new constructions and in the case of existing furnaces. The additional power required for it is slight in comparison with the power requirements of the whole furnace, amounting to about 0.3% of the total furnace power. In principle the coil can be fed from an external current source, but it is most economical for it to be integrated into the furnace circuit and to receive the furnace current. It then advantageously serves another purpose: in direct-current arc furnace plants direct current chokes are normally employed in the supply equipment, so that the entire furnace control functions. Thus, for example, in a 12-pulse-rectifier two chokes are required, each having five turns, through which typically approximately 40 kA are passed. Now, the coil arrangements on the underside of the furnace vessel can advantageously be used as these very chokes, which can be effected, for example, by subdividing the one coil into two coils connected magnetically in parallel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
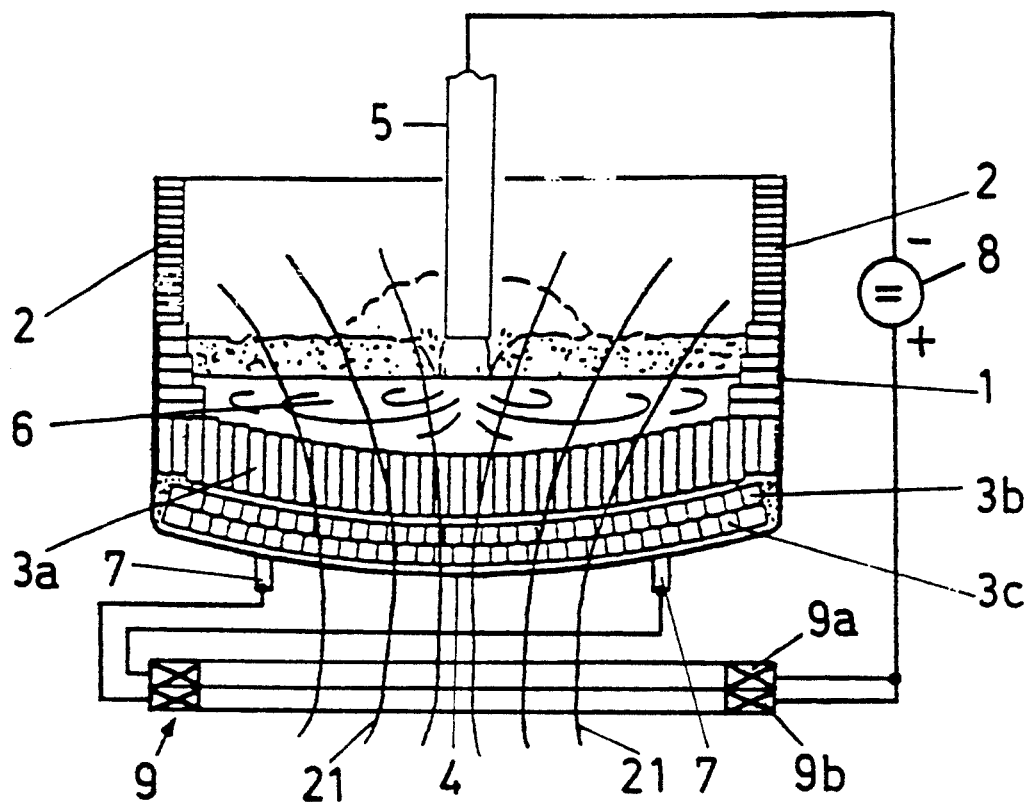
FIG. 1 shows an exemplary embodiment of a direct current arc furnace having underneath the vessel bottom a magnet coil through which the furnace current passes.

Referring now to the drawings, wherein like reference numerals designate identical or corresponding parts throughout the several views, in FIG. 1 the bottom part of the shell comprises a metal vessel shell 1, the walls of which are provided with a refractory lining 2. The entire bottom of the furnace vessel is in the form of a bottom electrode 3 and consists of a plurality of layers of electrically conductive bricks 3a, 3b, 3c of refractory material, to which carbon has been added in order to increase its conductivity. The bricks lie on a bottom plate 4, which at the same time serves to make contact with the bottom electrode 3. An arc electrode 5 projects from above into the furnace vessel to a point slightly above the melt 6. In the exemplary embodiment the furnace has only one electrode 5 connected as the cathode, but this number may also amount to two, three or more. The bottom electrode 3 is provided with current connections 7, which lead to the positive pole of a current supply device 8.

To this extent the direct-current arc furnace corresponds to the prior art and is described in detail, for example, in U.S. Pat. No. 4,228,314 or also in German Patent Specification 30 22 566.

According to the invention a magnet coil 9, consisting in the case of the example of two individual coils 9a and 9b connected magnetically in parallel, is now provided on the underside of the furnace vessel. This magnet coil 9 is disposed at a distinct distance from the bottom of the vessel and has an area of the order of magnitude of the free melt bath surface of the melt 6.

In a typical 80-ton direct-current arc furnace with a furnace diameter of about 5.5 meters and with an inside diameter of about 4.5 meters, the diameter of the magnet coil amounts to about 2 meters. The distance from the melt is about 1.3 meters.

Figure 2:
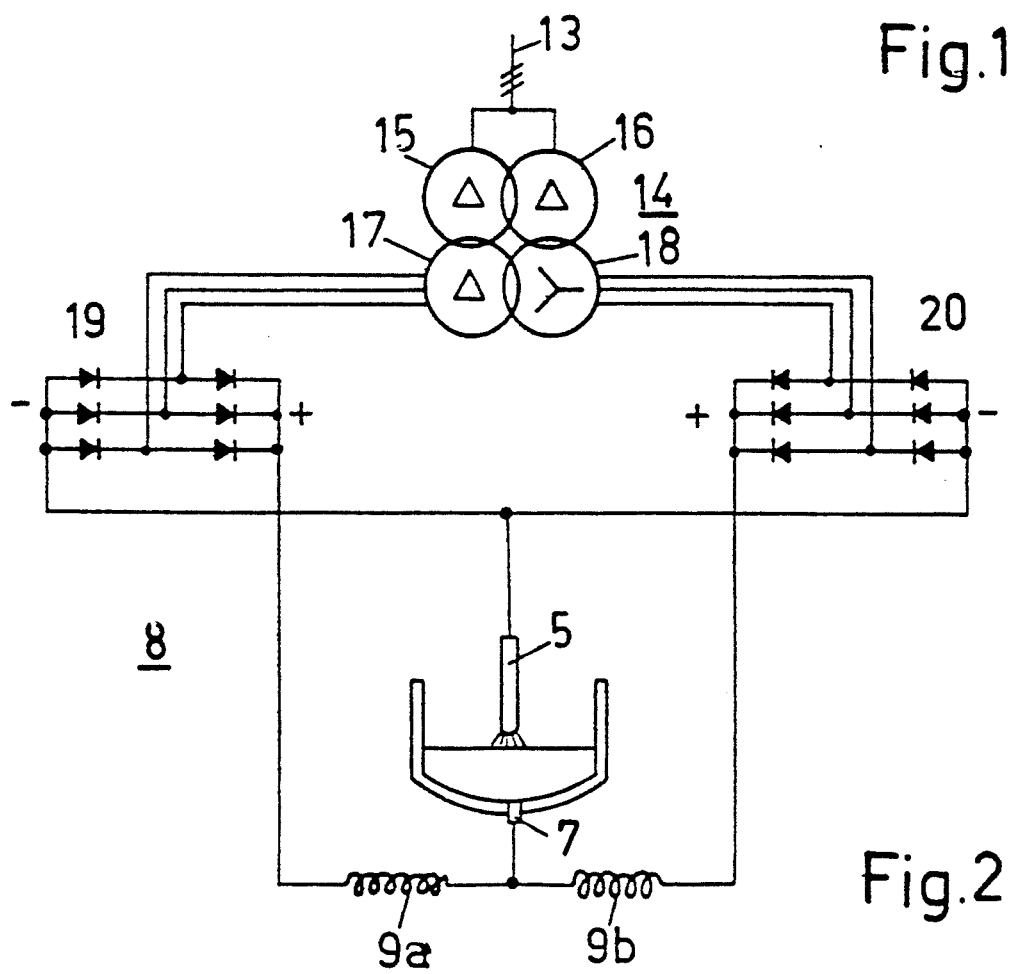
FIG. 2 shows a circuit arrangement with a 12-pulse-rectifier, wherein the electromagnets are integrated into the furnace supply.

As can be seen in FIG. 2, half the furnace current flows through each of the two individual coils 9a and 9b. However, there may also be only one coil through which the entire furnace current passes.

The circuit arrangement shown in FIG. 2 shows a typical current supply equipment for a modern direct-current arc furnace with a 12-pulse-rectifier arrangement. Connected to a three-phase network 13 is a transformer 14 having two primary windings 15, 16, which are delta-connected, and two secondary windings 17, 18, one of which is delta-connected and the other star-connected. Both secondary windings lead to a three-phase rectifier bridge circuit 19 and 20, respectively. The negative busbars are connected to one another and lead to the melting electrode 5. Located between each positive busbar of the bridge circuits 19 and 20 and of the bottom electrode 2 is a part-coil 9a and 9b respectively. According to the invention, these two part-coils now form the electromagnet consisting here of two coils, the connections and winding direction of the coils naturally being so disposed that these part-magnets are connected magnetically in parallel. In a six-pulse rectifier circuit the windings 15, 17 or 16, 18 of the transformer 14 and accordingly one of the bridges 19 and 20, respectively, and also one of the part-coils 9a and 9b, respectively, were dispensed with.

With a current density of, for example, 5A/mm$^2$, the weight of the electromagnet is approximately 4000 kg and the electrical losses are approximately 200 kW, an acceptable value considering that the power requirement of a direct-current arc furnace of this type is around 65 MVA; consequently, the power requirement of the entire plant increases only by approximately 0.3%.

Figure 3:
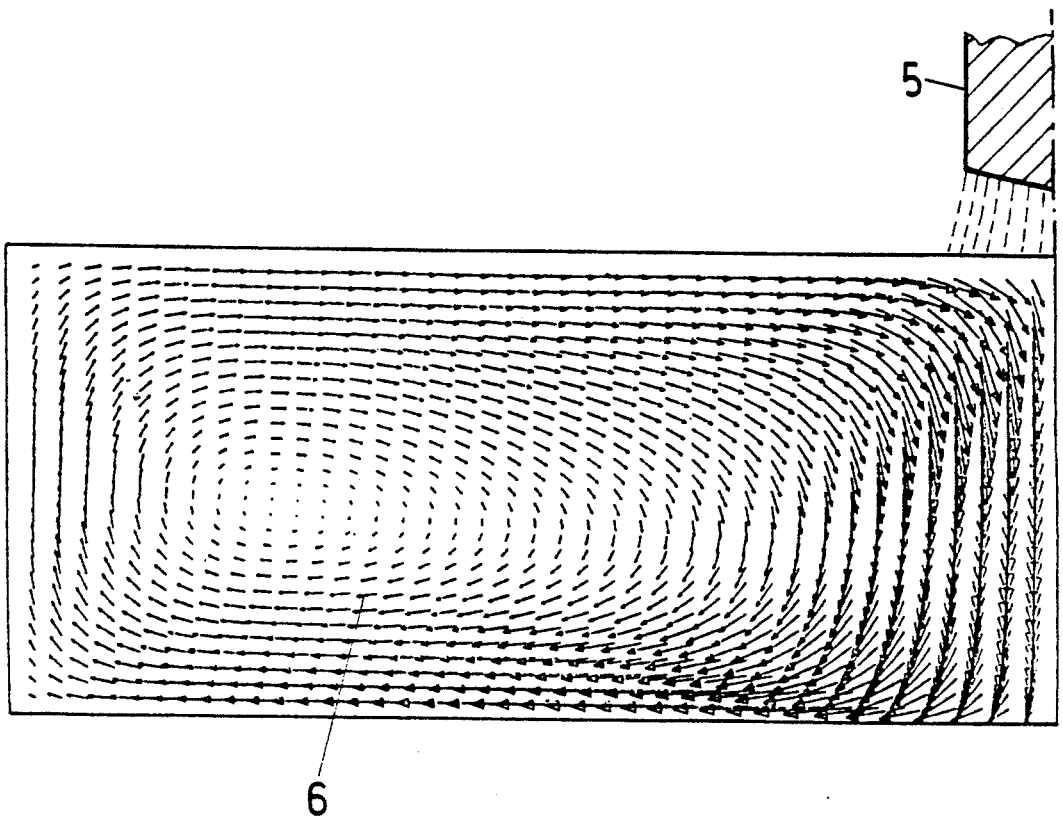
FIG. 3 shows graphically the flows occurring in the melt in a direct-current arc furnace, without an external magnetic field.

During the operation of the furnace without a magnet coil 9, a bath agitation occurs in the melt as shown in FIG. 3 in the form of a velocity profile (for one half of the bath). The longer the arrows, the higher is then in each case the local velocity of flow. It can clearly be seen that in the region under the electrode 5 the melt flows at a high speed from the surface to the bottom contact, speeds of 0.5 m/sec being reached. These high speeds in conjunction with the temperature of the melt lead to erosion of the bottom contact.

Figure 4:
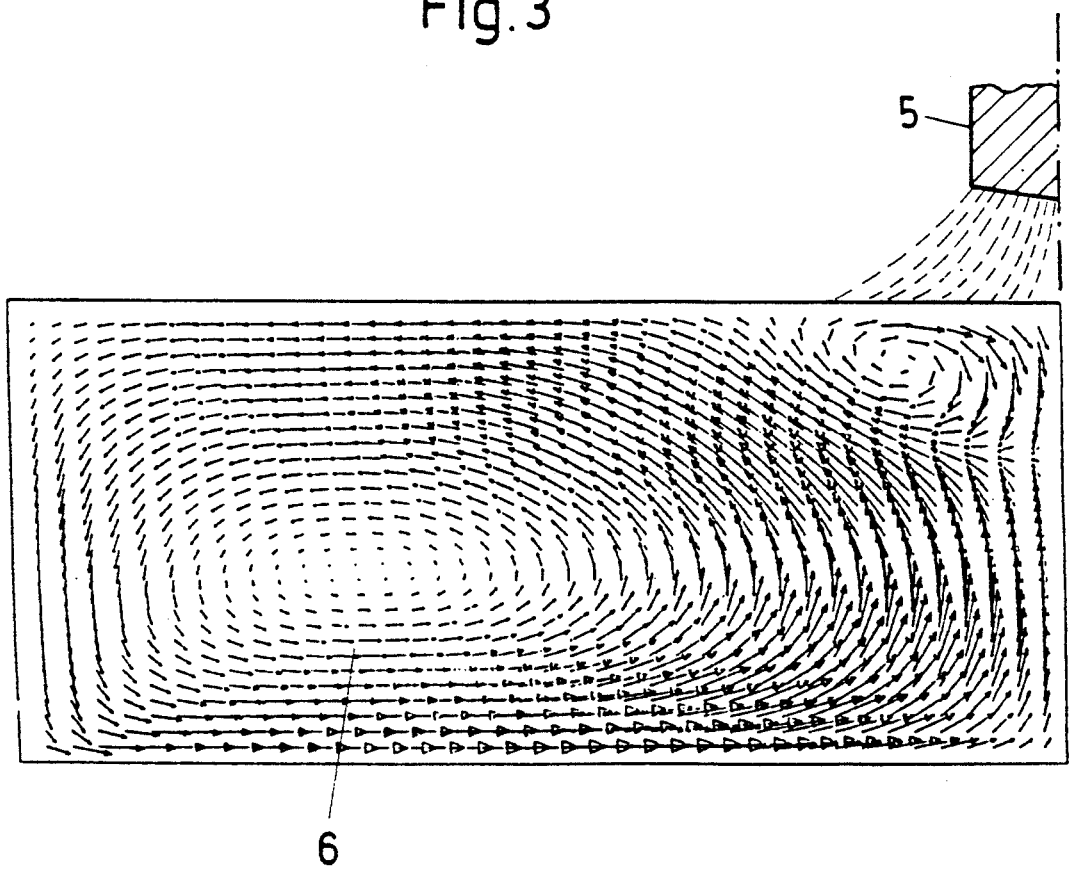
FIG. 4 shows graphically the flows occurring in the melt in the direct-current arc furnace according to the invention, with a magnet coil disposed under the vessel.

With a suitably dimensioned magnet coil 9, on the other hand—the field emanating from it is symbolized in FIG. 1 by the field lines 21—the force actions occurring from the furnace current in the melt are superimposed on that of the external magnetic field in such a manner that in the region under the electrode 5 a reversal of direction takes place in the melt, at least in the region near the bottom, as can clearly be seen in FIG. 4. The velocity of flow in the region near the bottom is also lower and—an essential point for the service life of the bottom contact—in the critical region under the electrode 5 the melt current no longer impinges vertically or almost vertically on the bottom. The fact that the melt now impinges on the bottom contact at the edge of the vessel is less critical, because it does so there at a lower speed and at a lower temperature.

In the region near the surface the melt flows, as previously, under the electrode 5 from top to bottom. However, a transition zone is formed, in which the two currents flowing towards one another turn radially outwards. The depth at which these two currents collide is determined both by the height of the furnace flow and by the size of the external magnetic field. In this respect the following guide values have been found:

With an ampere-turns number exceeding the furnace current by the factor 2 or more, the reversal of direction described takes place at least in the region near the bottom.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A direct-current arc furnace comprising:
   a furnace vessel for containing a melt;
   a top cathode located above the furnace vessel;
   at least one anode connected to the furnace vessel;
   a current supply means for supplying a furnace current to the top cathode and to the at least one anode to agitate the melt in a direction from the cathode to the anode;
   a coil located underneath a bottom of the furnace vessel, wherein a furnace current flows through the coil for generating a magnetic field, wherein the coil has a predetermined number of ampere-turns causing a direction of agitation from the cathode to the anode to be at least partly reversed by the magnetic field generated by the coil, wherein said predetermined number of ampere-turns is at least twice the furnace current.

2. The direct-current arc furnace according to claim 1, wherein the coil comprises two individual coil elements which are connected in parallel, and through each of which one-half of the furnace current flows.

3. A direct-current arc furnace comprising:
   a furnace vessel for containing a melt;
   a top cathode located above the furnace vessel;
   at least one anode connected to the furnace vessel;
   a current supply means for supplying a furnace current to the top cathode and to the at least one anode to agitate the melt in a direction from the cathode to the anode;
   a coil located underneath a bottom of the furnace vessel, wherein a furnace current flows through the coil for generating a magnetic field, wherein the coil has a predetermined number of ampere-turns causing a direction of agitation from the cathode to the anode to be at least partly reversed by the magnetic field generated by the coil, and wherein the coil comprises two individual coil elements which are connected in parallel, and through each of which one-half of the furnace current flows.

4. The direct-current arc furnace according to claim 3, wherein the coil has a predetermined area approximately corresponding to an area of the at least one anode.

5. A direct-current arc furnace comprising:
a furnace vessel for containing a melt;
a top cathode located above the furnace vessel;
at least one anode connected to the furnace vessel;
a current supply means for supplying a furnace current to the top cathode and to the at least one anode to agitate the melt in a direction from the cathode to the anode;
a coil located underneath a bottom of the furnace vessel, wherein a furnace current flows through the coil for generating a magnetic field, wherein the coil has a predetermined number of ampere-turns causing a direction of agitation from the cathode to the anode to be at least partly reversed by the magnetic field generated by the coil, and wherein the coil has a predetermined area approximately corresponding to an area of the at least one anode.

* * * * *